No. 863,287. PATENTED AUG. 13, 1907.
G. F. KUNZ.
DEVICE FOR EFFECTING ILLUMINATION.
APPLICATION FILED DEC. 23, 1903.
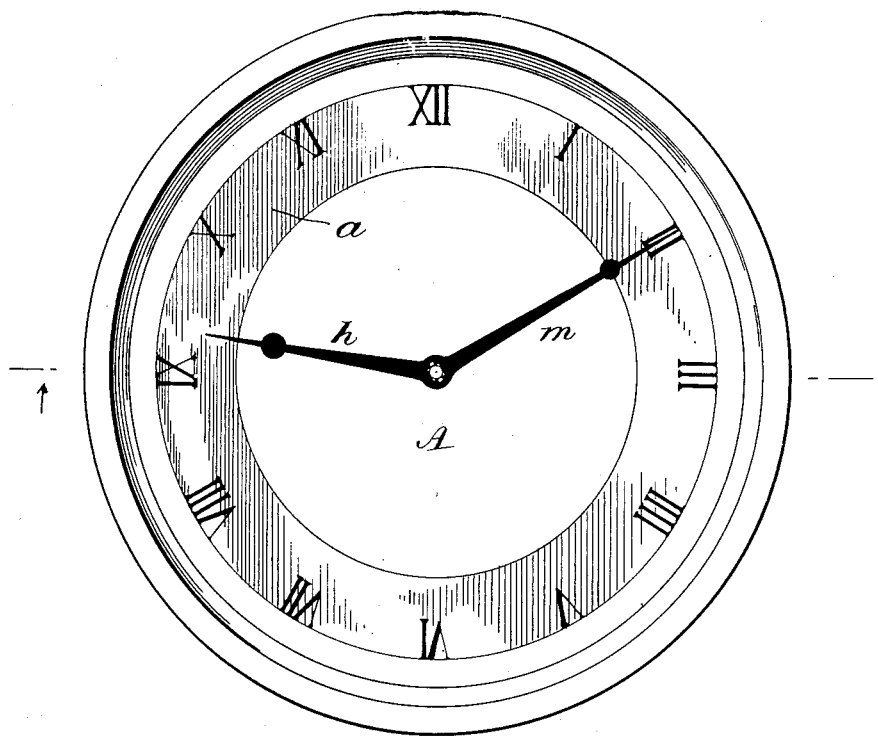
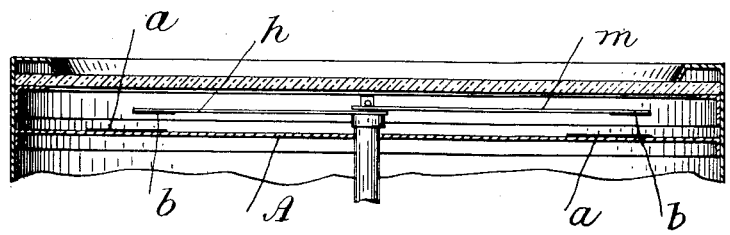

UNITED STATES PATENT OFFICE.

GEORGE F. KUNZ, OF NEW YORK, N. Y.

DEVICE FOR EFFECTING ILLUMINATION.

No. 863,287.  Specification of Letters Patent.  Patented Aug. 13, 1907.

Application filed December 23, 1903. Serial No. 186,380.

*To all whom it may concern:*

Be it known that I, GEORGE F. KUNZ, a citizen of the United States of America, residing at New York city, in the county of New York and State of New York, have invented certain new and useful Improvements in Devices for Effecting Illumination, of which the following is a specification.

My invention relates to the illumination of the indicating or recording parts of measuring instruments for the purpose of clearly rendering visible the particular indication in the dark or semi-darkness.

To this end my invention consists essentially in coating or otherwise providing the dials of watches, clocks, electric meters, gas meters, steam gages and any and all other measuring instruments or apparatus with a radio-responsive substance such as willemite, zinc sulfid, calcium sulfid, kunzite, or any other substance possessing like properties, and in providing the hand or indicator, or hands or indicators with a small quantity of a radio-active body such as a radium compound, actinium, polonium, or other substance possessing like qualities, or proven to possess such like qualities.

The nature of my invention will best be understood when described in connection with the accompanying drawings in which:—

Figure 1 represents a face view of a clock dial and its hands containing my invention. Fig. 2 is a transverse section thereof.

Similar letters of reference designate corresponding parts throughout the several views of the drawings.

In carrying out my invention, I apply to the clock dial A over its entire face or preferably, as shown, through a belt *a* taking in the ends of the hands *m* and *h* a paint, say of willemite formed with the use of liquid glass or other media, such as oil, varnish, water, &c., and to the adjacent surfaces or ends of the hands I apply a small area *b* of a radio-active material, such as a radium compound, actinium, polonium, etc. It is now evident that as the hands of the clock travel over the dial, the portions of the radio-responsive surface opposite the radio-active portions of the hands will mutually coöperate to illuminate the corresponding portion of the dial so that the time can be readily ascertained in the dark. The radio-active material may be applied as a paint, the same as the radio-responsive material, or it may be confined between transparent plates.

It is of course to be understood that my invention can be equally well applied to indicating or measuring instruments of all kinds with one or more hands or markers, and to scientific and other apparatus or devices, therefore I do not wish to restrict myself to any particular application of the same, and that the radio and radio-responsive substances may be fused into or otherwise applied to the bases.

It is of course to be understood that the entire indicating hand may be coated with the radio-active material, as well as the dial, although this is not absolutely necessary.

The particular method of application or the particular radio or radio-responsive bodies employed form no part of my invention, the essential feature of which consists in obtaining individual illumination by bringing radio and radio-responsive bodies adjacent to each other in relatively moving parts.

What I claim as new is:—

1. In an indicating device, a dial having parts thereof provided with radio-responsive material and an indicating hand or pointer provided with a radio-active material emanating cold rays.

2. In an indicating device, a dial provided with a radio-responsive material, and an indicating hand or pointer provided with a radio-active material emanating cold rays.

3. An indicating instrument having its relatively moving parts provided respectively with radio-responsive and with radio-active substances emanating cold rays.

In testimony whereof I have hereunto set my hand in the presence of two subscribing witnesses.

GEORGE F. KUNZ.

Witnesses:
WILLIAM J. CAMPBELL,
RAENA H. YUDIZKY.